US006901603B2

(12) United States Patent
Zeidler et al.

(10) Patent No.: US 6,901,603 B2
(45) Date of Patent: May 31, 2005

(54) METHODS AND APPARATUS FOR ADVANCED RECORDING OPTIONS ON A PERSONAL VERSATILE RECORDER

(75) Inventors: David E. Zeidler, Warrington, PA (US); Wayne D. Woodruff, Chalfont, PA (US); Robert M. Simons, Lansdale, PA (US)

(73) Assignee: General Instrument Corportion, Horsham, PA (US)

(*) Notice: Subject to any disclaimer, the term of this patent is extended or adjusted under 35 U.S.C. 154(b) by 127 days.

(21) Appl. No.: 09/902,327

(22) Filed: Jul. 10, 2001

(65) Prior Publication Data

US 2003/0012554 A1 Jan. 16, 2003

(51) Int. Cl.[7] .............................................. H04N 5/445
(52) U.S. Cl. ........................... 725/39; 725/58; 725/141; 386/83
(58) Field of Search ............................... 386/83; 725/38, 725/55, 133, 134, 141, 142, 153, 39, 58; H04N 5/445

(56) References Cited

U.S. PATENT DOCUMENTS

| | | | | |
|---|---|---|---|---|
| 4,787,063 A | * | 11/1988 | Muguet | 386/83 |
| 5,659,653 A | | 8/1997 | Diehl et al. | |
| 5,852,474 A | | 12/1998 | Nakagaki et al. | |
| 5,995,155 A | | 11/1999 | Schindler et al. | |
| 6,141,488 A | * | 10/2000 | Knudson et al. | 386/83 |
| 6,226,444 B1 | * | 5/2001 | Goldschmidt Iki et al. | 386/83 |
| 6,233,389 B1 | | 5/2001 | Barton et al. | |
| 2001/0049820 A1 | * | 12/2001 | Barton | 725/32 |
| 2001/0051037 A1 | | 12/2001 | Safadi et al. | |

FOREIGN PATENT DOCUMENTS

| | | |
|---|---|---|
| GB | 2 328 825 | 3/1999 |
| WO | 01/11865 | 2/2001 |
| WO | 01/22729 | 3/2001 |

OTHER PUBLICATIONS

Press Release entitled "*Comcast Corporation to Begin ReplayTV Service Trial in Aug.,*" A&R Partners for ReplayTV, Inc., Jul. 25, 2000 (2 Pages).

* cited by examiner

*Primary Examiner*—Vincent Boccio
(74) *Attorney, Agent, or Firm*—Barry R. Lipsitz; Douglas M. McAllister

(57) ABSTRACT

Advanced recording options are provided on a personal versatile recorder (PVR) or similar recording device. Television signals and associated electronic programming guide (EPG) data are received at a receiver (30). Recorded program material is stored in a storage device (60). A processor (75) provides for automatic suspending of recording, based on predetermined criteria, for at least a portion of time during which the one or more television programs would otherwise be recorded. Recording may be suspended when non-programming specific content (e.g., a commercial or emergency broadcast) is received at the PVR (20). Non-program specific content can be identified through the use of EPG data or Advanced Television Enhancement Forum (ATVEF) triggers. End of program notifiers may be provided which enable the PVR (20) to record the entire program, regardless of whether the program runs beyond its scheduled time. Recording may be optionally suspended where the program is a rerun.

14 Claims, 2 Drawing Sheets

METHODS AND APPARATUS FOR ADVANCED RECORDING OPTIONS ON A PERSONAL VERSATILE RECORDER

BACKGROUND OF THE INVENTION

The present invention relates to the field of multi-media recording and playback. More specifically, the present invention relates to the provision of advanced recording options on a personal versatile recorder (PVR) or similar device. In particular, the present invention provides methods and apparatus for suspending recording of programming material when non-programming specific content (e.g., a commercial or emergency broadcast) is received at the PVR. The non-program specific content can be identified through the use of EPG data or Advanced Television Enhancement Forum (ATVEF) triggers. Further, the present invention provides the ability to optionally suspend recording of a program if it is determined that the program is a rerun. The PVR device of the present invention may be programmed to record based on received Electronic Programming Guide (EPG) data, VCR Plus Codes, or similar data.

Cable and satellite television systems are capable of providing a viewer with hundreds of channels of television programming. Such an abundance of programming often creates difficult viewing choices for a viewer when two programs that the viewer would like to watch are broadcast simultaneously. In addition, a viewer may like to record for later viewing a program which is broadcast at an inconvenient time.

These problems were first overcome by recording devices such as the video cassette recorder (VCR). A VCR allows a viewer to record incoming audiovisual programming while viewing a different channel. A VCR also allows a viewer to record programming while the viewer is unavailable to watch the programming by presetting program times into the VCR. Thus, the VCR allows a viewer to record and view programming that the viewer would otherwise not be able to view.

The VCR concept has been expanded in recent years to include digital compression devices that provide additional features for managing the reception and recording of analog audiovisual programming. Such products have been given various names, such as personal video recorders, video recording computers, and personal television servers (hereinafter "personal video recorders"). Current examples of personal video recorders include the TiVo® system made by TiVo, Inc. and the ReplayTV® system made by Replay Networks, Inc.

Personal video recorders replace the conventional VCR recording medium with a hard drive internal to the recorder. The personal video recorder is connected between a viewer's television set and a set-top terminal, satellite receiver, or antenna. The personal video recorder can control the channel tuned on the television, provide an interactive electronic program guide, and record programming on a manual or timer controlled basis. Additionally, the personal video recorder can buffer incoming audiovisual programming to enable a viewer to pause or replay a portion of a live television program, so long as the pause or replay does not exceed the capacity of the buffer. The personal video recorder can alternatively be built into the set-top terminal or the television, instead of comprising a separate stand alone device.

However, the prior art personal video recorder does not have the capability to store and replay other types of media, including Internet data files such as web pages, MP3 files, JPEG files, bit map files, and the like. In addition, the prior art personal video recorder does not have the capability to store, retrieve and replay streamed audiovisual digital programming content from the Internet or other caching servers.

The personal versatile recorder (PVR) developed by General Instrument Corporation of Horsham, Pa., the assignee of the present invention, overcomes the disadvantages of the prior art personal video recorders. One implementation of a PVR is described in U.S. patent application Ser. No. 09/520, 968, filed on Mar. 8, 2000, entitled "Personal Versatile Recorder and Method of Implementing and Using Same." The PVR enables the receipt, recording, retrieval and playback of a variety of types of data or data files on a hard drive, including but not limited to digital and analog audiovisual programming, streaming media, picture files, video files, audio files, Hypertext Markup Language (HTML) files, and various types of Internet multimedia content.

These prior art recording devices are all capable of programmable recording of television programming. Such programmable recordings are usually based on a predetermined time period during which a program is scheduled to be broadcast. For example, if a viewer would like to record a television program that is scheduled to be broadcast from 8:00 P.M. to 8:30 P.M. on a Tuesday evening, the viewer can program the recording device by presetting the time, date and channel to be recorded in the recording device. Some prior art systems allow a user to program a recording device through the EPG data. A user can select a program to be recorded from the menu provided by the EPG, and the EPG data provides the recording device with the necessary time, date and channel information to enable recording. Alternatively, certain types of recording devices are capable of recording television programming based on codes associated with the programming to be recorded (e.g., VCR Plus Codes), which may be entered by the user into the recording device. The code provides the recording device with a predetermined channel the program will be received on. the program date, the program start time and the program stop time.

Under either of these prior art programming methods, the recording device will then proceed to record whatever programming is broadcast at the programmed time, regardless of programming schedule change, broadcast delay, emergency broadcast interruption, and commercial interruption. In addition, these prior art recording devices will terminate recording at the predetermined time allotted for the program being recorded, without regard to whether the allotted program time has been extended, for example when the program being recorded has been interrupted (e.g., by breaking news reports or emergency broadcasts) or where the program being recorded has run longer than scheduled (e.g., a sporting event that goes into overtime). Such recording devices will also proceed to record the programming without regard to whether the programming is a rerun of previously broadcast programming.

Additionally, many prior art recording devices allow for recording of a program by program name (whether through the use of codes or EPG data). It is common for many viewers to program their recording devices to record their favorite show or shows by name. In such instances, the recording device will record all shows broadcast, without regard to whether they are reruns or not. This results in unwanted duplicate recording at the recording device.

In most cases, when replaying the recorded programming, a viewer will fast forward over non-program specific content, such as commercials, emergency broadcasts, and the like. In addition, the recording will be of no value to the viewer where a schedule change, broadcast delay, or broadcast interruption has resulted in only a portion of the desired program being recorded, or the desired program not being recorded at all. Further, the recording will be of no value to a viewer in the event the recorded program is a rerun that the viewer has already seen or that has been previously recorded.

It would be advantageous to provide a recording device which can selectively suspend recording when non-program specific content is received, so that only the program material desired to be viewed is recorded. It would also be advantageous to provide for suspension of recording based on EPG data or Advanced Television Enhancement Forum (ATVEF) triggers in order to avoid missing part or all of the program to be recorded. It would also be advantageous to provide an end of program notifier to enable a recording device to continue recording until notification is provided that the program has ended. It would be further advantageous to provide a recording device which can optionally suspend recording when a rerun of a program is received. It would be advantageous if such a recording device could be programmed using EPG data, VCR Plus codes, or the like.

The methods and apparatus of the present invention provide the foregoing and other advantages.

SUMMARY OF THE INVENTION

The present invention relates to the provision of advanced recording options on a personal versatile recorder (PVR) or similar device. In particular, the present invention provides methods and apparatus for suspending recording of programming material when non-programming specific content (e.g., a commercial or emergency broadcast) is received at the PVR. A plurality of television signals are received at a receiver. The PVR device is capable of recording one or more television programs for playback. The recorded program material is stored in a storage device (e.g., a magnetic or optical hard drive or the like). A processor provides for the automatic suspension of recording, based on predetermined criteria detected by the processor at the PVR, for at least a portion of time during which the one or more television programs would otherwise be recorded.

Program recording may be suspended during the time when non-program specific content is received at the PVR (e.g., an emergency broadcast or commercial). End of program notifiers may be provided which enable the PVR (20) to record the entire program, regardless of whether the program runs beyond its scheduled time due to program interruption. In addition, program recording may be automatically suspended or prevented when a rerun of a program is detected.

BRIEF DESCRIPTION OF THE DRAWINGS

The present invention will hereinafter be described in conjunction with the appended drawing figures, wherein.

DETAILED DESCRIPTION OF THE INVENTION

Figure 1:
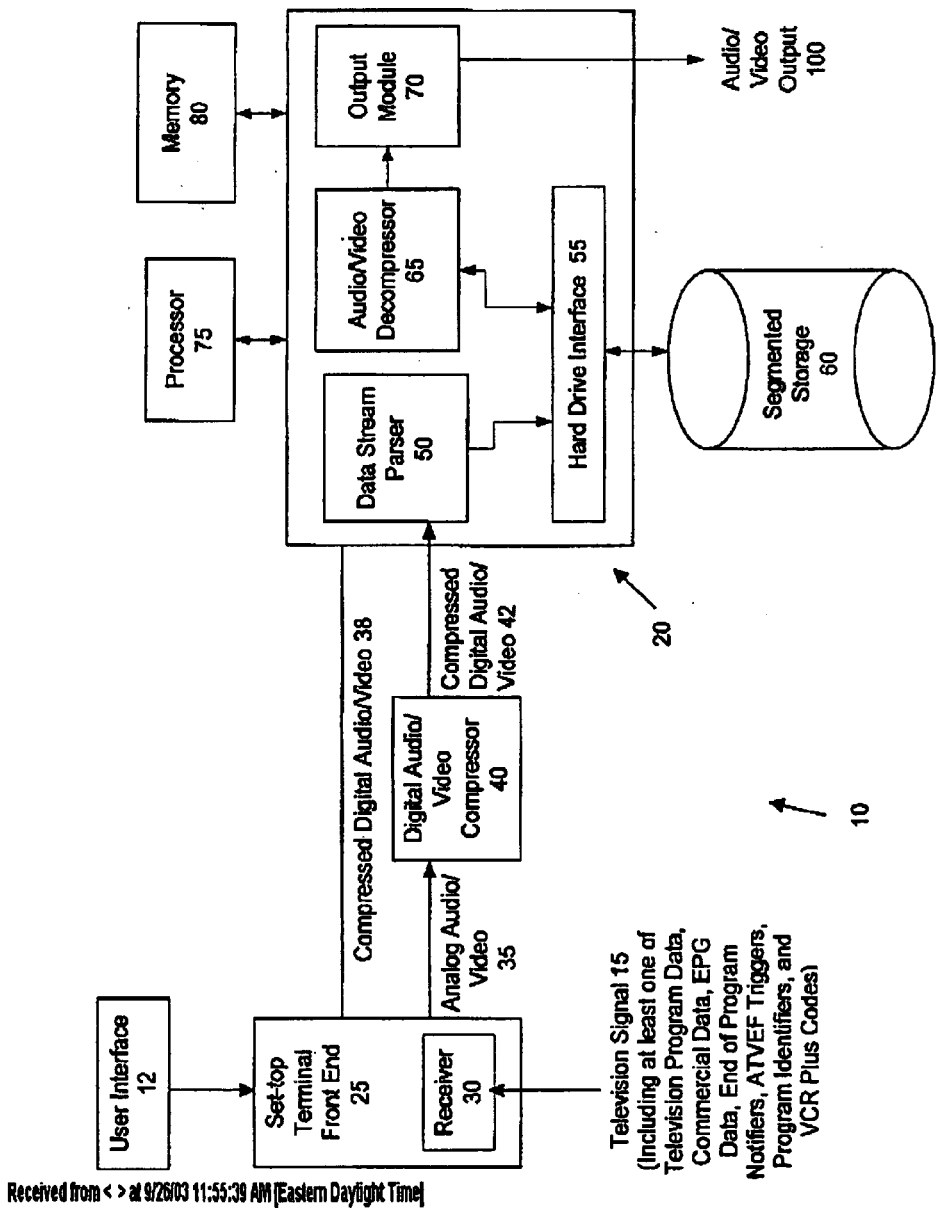
FIG. 1 shows an exemplary embodiment of the present invention implemented in a personal versatile recorder subsystem of a set-top terminal.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

In addition, it should be understood by those skilled in the art that, although the invention is described as implemented in connection with a personal versatile recorder device (PVR) subsystem of a set-top terminal, the invention may also be implemented for use in a stand alone PVR device. In addition, those skilled in the art will realize that the invention may be implemented in connection with other types of recording devices, including personal video recorders, digital video recorders, video cassette recorders, and the like.

The present invention may be implemented in a PVR device or similar recording device. The drawing shows a simplified PVR subsystem 20 contained in a set-top terminal generally designated 10. A detailed description of a PVR subsystem is provided in commonly assigned, co-pending U.S. patent application Ser. No. 09/520,968, filed on Mar. 8, 2000, entitled "Personal Versatile Recorder and Method of Implementing and Using Same." A brief overview of a simplified PVR subsystem will assist in the explanation of the invention. As illustrated in the drawing, set-top terminal 10 receives a television signal 15 in a conventional manner at a receiver 30 in the front-end 25 of the set-top terminal. The receiver 30 may receive an analog signal or a digital signal. In addition to a receiver 30 (which includes a television tuner), the front-end 25 of the set-top terminal 10 may also include an analog video demodulator and a descrambler for demodulating and descrambling a received analog signal in a conventional manner. Similarly, a demodulator and decryptor may be provided in the front-end 25 for demodulating and decrypting a received digital signal in a conventional manner.

In the event that receiver 30 is an analog receiver, the selected analog audio/video signal 35 is converted to a compressed digital signal 42 at a digital audio/video compressor 40. The compressed digital signal 42 is then passed to a data stream parser 50 of the PVR subsystem 20. In the event the received signal is a digital signal, the compressed digital signal 38 is passed directly to the data stream parser 50 of the PVR subsystem 20.

The data stream parser 50 extracts compressed digital audio/video packets (e.g., in response to a user's request for recording of a particular program) from the compressed digital audio/video signals (38, 42) and forwards the digital audio/video packets to a hard drive interface 55 for writing to a storage device 60. Storage device 60 may comprise a hard drive, an optical disk, or any other suitable type of mass storage device, or combination of devices. The storage device 60 stores the digital audio/video packets. The audio/video decompressor 65 can then access and retrieve the digital audio/video packets from the storage device 60 (via hard drive interface 55), decompress the digital audio/video packets, and forward them to the output module 70. The output module 70 converts the decompressed digital audio/video packets to a standard audio/video format, which is provided as output 100 to a display device (not shown). A processor 75 is provided for control of the PVR subsystem. Those skilled in the art will appreciate that processor 75 may be the central processing unit of the set-top terminal 10, or may provide processing functions for the PVR subsystem 20 only.

Memory 80 provides storage and buffering for all conventional set-top terminal functions which require memory, such as audio/video processing, decompression, graphics systems, transport processing, and the like. With respect to the PVR device 20, memory 80 provides various storage and buffering functions, including storage for data stream processing (i.e. picking out the data a user wants to record and/or playback from the digital data stream coming into the data stream parser 50), buffering in connection with decompression of the audio/video packets, buffering of output audio/video to enable trick play modes such as scan forward, scan backward, jump, pause, and stop, as well as storage for anything that the processor 75 may need in order to control the PVR device 20, such as building index tables into the video stream to enable video navigation by the PVR. Memory 80 may also provide memory for graphics processing by the PVR and buffering for use in video encoding in connection with the audio/video decompressor 65 (e.g., as necessary to convert the decompressed digital audio/video packets to standard audio/video formats for output to the display device).

In a preferred embodiment, advanced recording options are enabled on a PVR subsystem as shown in the drawing. A plurality of television signals 15 are received at the receiver 30. The PVR device 20 is capable of recording one or more television programs for playback. The recorded program material is stored in the storage device 60. A processor 75 provides for the automatic suspension of recording, based on predetermined criteria detected by the processor 75 at the PVR 20, for at least a portion of time during which said one or more television programs would otherwise be recorded. The processor 75 controls the PVR based on data extracted from the compressed digital audio/video signal (i.e. signal 38 or 42) by the data stream parser 50. In this manner, for example, the PVR can enable suspension of recording.

The recording may be suspended during the time when non-program specific content is received at the PVR 20. The predetermined criteria used to determine when the recording is to be suspended may comprise electronic programming guide (EPG) data, which is indicative of the specific times when the desired program content is being (or is to be) provided. In the alternative, the predetermined criteria may comprise Advanced Television Enhancement Forum (ATVEF) triggers that specify which content is program specific, which content is non-program specific, and/or provide other information that will trigger the PVR to take appropriate action. Such action by the PVR may include, for example, starting a record cycle (e.g., to capture desired content such as a movie or television program) or suspending a current record cycle (e.g., during a commercial). Alternatively, the predetermined criteria may comprise data embedded within the television program signal itself, or data contained within an auxiliary data stream.

In a further embodiment, end of program notifiers are provided (e.g., as part of the programming material or in auxiliary data) to the PVR 20 which identify the end of a program. Recording of the program by the PVR 20 is continued until receipt of the notifier. The end of program notifiers may be provided in ATVEF trigger information, a vertical blanking interval of an analog television signal, a program identifier (PID) of digital television signal, or in any other suitable format. It should be appreciated that there are many methods and formats available for inserting and retrieving the notifier in the program, including ATVEF, Internet Protocol (IP) over VBI, or lower level formats such as those promulgated by the National Association of Broadcast Transmission Standards (NABTS). Analog source material would, for example, have the end of program notifier embedded in the VBI. Digital source material would have the notifier in an associated data packet stream or embedded in the video PID stream. The details of the implementation of embedding the end of program notifier are not the essential objective of the invention. The provision and general capability of such an identifier is the focus of this embodiment of the invention.

Each television program may have a program end time. In a further embodiment, the PVR 20 waits a predetermined amount of time after the program end time to receive the end of program notifier. Recording of the program is terminated at the first to occur of (i) lapsing of the predetermined amount of time, and (ii) receipt of the end of program notifier. In this manner, a limit can be established on how long the PVR 20 records after the program end time while waiting for the end of program notifier. In addition, the invention may be implemented such that end of program notifiers which are received prior to the program end time are either ignored or accepted. Further, end of program notifiers which are received a before the program end time may be accepted only if the notifier arrives within a predetermined amount of time before the program end time. For example, where a program end time is 8:30 P.M., the PVR may accept end of program notifiers that are received within 5 minutes of the program end time (i.e., between 8:25 and 8:30). Therefore, any end of program notifiers received prior to 8:25 will not be accepted, while end of program notifiers received after 8:25 will be accepted and recording will be stopped.

Additional information may be provided to the PVR 20 indicating that the program supports end of program notifiers. Based on this information, the processor 75 will configure the PVR 20 to terminate the recording based on the notifier. This additional information may be provided in the EPG data, or in the same format as the notifiers (e.g., in ATVEF trigger information, a vertical blanking interval of an analog television signal, a program identifier of digital television signal, or the like). In this way, the PVR 20 can wait for the notifier, or stop recording at the program end time rather than continue to record while waiting for an end of program notifier that will never be received.

In an alternate embodiment, the recording may be automatically suspended or prevented when a rerun of a program is detected. In such an instance, the predetermined criteria may comprise, for example, EPG data. The EPG data may be received at receiver 30 in a conventional manner. A cable headend operator may control whether the recording of reruns is prevented at the PVR device 20 through the use of authorization commands sent from the headend to the PVR device 20 (e.g., via the set-top terminal 10). Alternatively, the user may control whether the recording of reruns is prevented through a user interface 12 at the PVR 20 (e.g., a remote control and menu application). As an example, this feature would allow a user to record by name all original broadcasts of a certain program, without recording the program reruns.

The PVR 20 may be implemented as part of a set-top terminal 10 as shown in the drawing. Alternatively, the PVR device 20 may be implemented as a stand-alone device, or as part of a digital television, a personal computer, or a similar device.

In a preferred embodiment, recording is automatically suspended, based on Advanced Television Enhancement Forum (ATVEF) triggers, when non-program specific content is received at the PVR 20. The non-program specific content may comprise a special announcement, an emergency broadcast, a commercial, or other broadcast interruption.

During the suspension of recording of non-program specific content, the non-program specific content may be stored to a location separate from the location where the program is being recorded (e.g., on a separate storage device or on a segmented portion of storage device 60).

The recording of one or more television programs may be based on the EPG data or VCR Plus codes, for example. Alternatively, the recording may be based on data embedded within the television program signal, or data contained within an auxiliary data stream.

A cable headend operator may control whether the recording is to be suspended during the time when non-program specific content is received at the PVR device 20 through the use of authorization commands sent from the headend to the PVR device 20. Alternatively, the user may control whether the recording is suspended through a user interface 12 at the PVR 20.

Figure 2:
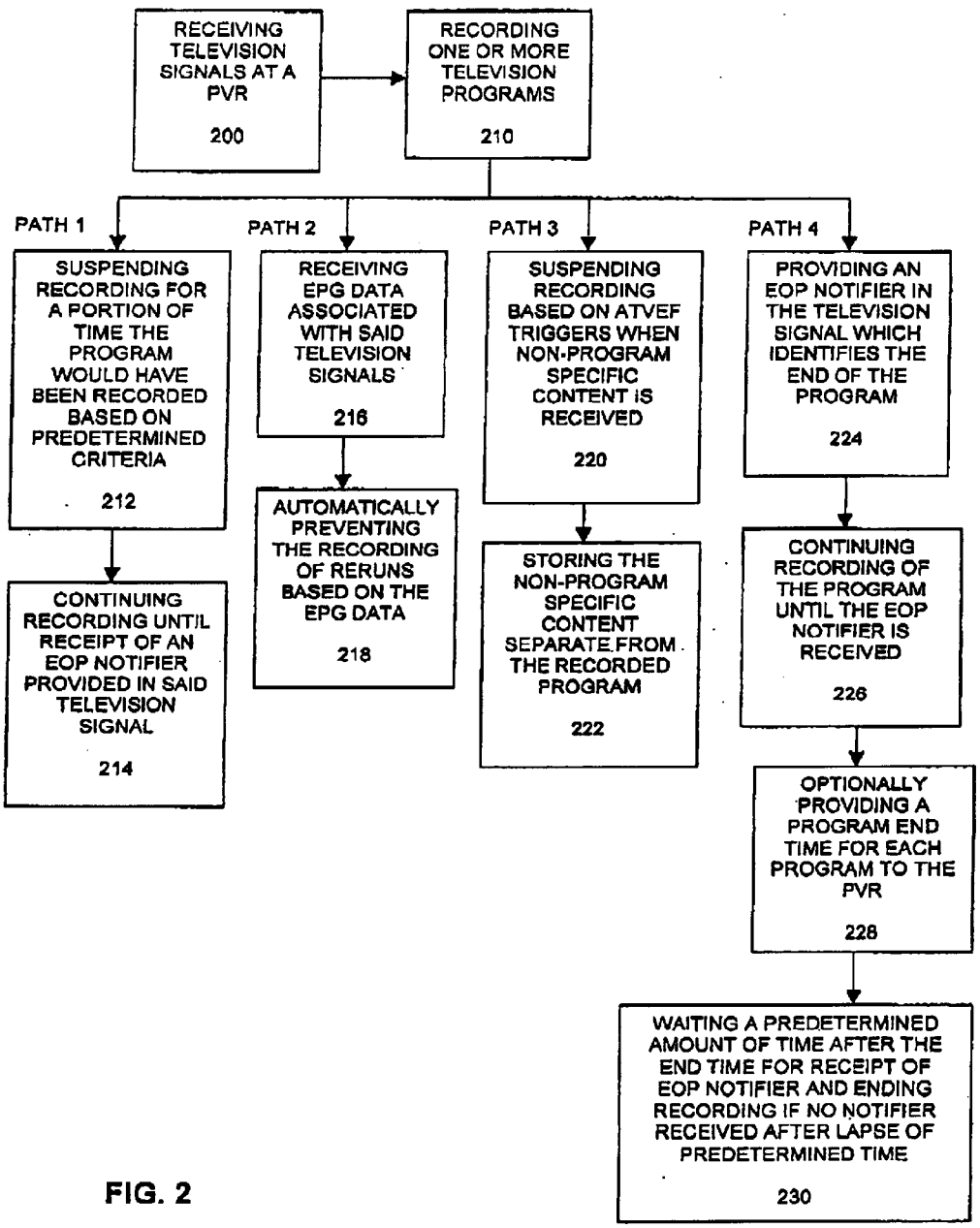
FIG. 2 shows a flowchart illustrating example embodiments of the present invention.

FIG. 2 shows a flowchart illustrating general example embodiments of the methods in accordance with the present invention. As shown in FIG. 2, television signals are received at the PVR device (step 200). The PVR device is enabled to record one or more television programs (step 210). In a first example embodiment (Path 1), recording of the program may be suspended for a portion of the time the program would have otherwise been recorded, based on predetermined criteria (step 212). The predetermined criteria is discussed above in connection with FIG. 1. Recording is continued until receipt of the end of program (EOP) notifier (step 214).

In a second example embodiment (path 2), EPG data associated with the television signals is received at the PVR (step 216). Recording of reruns can be automatically prevented at the PVR based on the EPG data, which identifies programs as being reruns (step 218).

In a third example embodiment (path 3), recording may be suspended based on ATVEF triggers when non-program specific content is received (step 220). ATVEF triggers are discussed above in connection with FIG. 1. The non-program specific content may be stored separately from the recorded program (step 222).

In a fourth example embodiment (path 4), an end of program notifier maybe provided in the television signal which identifies the end of the program (step 224). Recording is continued until the end of program notifier is received (step 226). Optionally, a program end time may be provided to the PVR for each program (step 228). The PVR may wait a predetermined amount of time after the end time for the end of program notifier to appear, so that recording is stopped at the first to occur of the receipt of the end of program notifier or the lapse of the predetermined time (step 230).

It should be appreciated that the various embodiments of the invention described herein may all be combined together in a single recording device. Alternatively, some or only one of the embodiments may be implemented in a device. For example, a PVR in accordance with the invention may be able to suspend recording when non-program specific content is received and continue recording until an end of program notifier is received. Alternatively, a PVR in accordance with the invention may record all material received from a predetermined start time until receipt of the end of program notifier, without suspension of recording. Further, these two exemplary PVR devices may be implemented in order to optionally prevent recording of reruns. Various other combinations of the inventive subject matter may be implemented as well.

It should now be appreciated that the present invention provides advantageous advanced recording options. Advantageous methods and apparatus are provided for selectively recording only program specific content, and suspending recording when non-program specific content is received at the recording device. End of program notifications advantageously enable the complete recording of programs which run past their scheduled time period. In addition, advantageous methods and apparatus are provided to optionally enable the suspension of recording of program reruns. The automatic commencement and suspension of the recording process during receipt of desired and undesired content, respectively, as well as the end of program notifiers, can be provided by auxiliary data, such as, e.g., ATVEF triggers, carried in the compressed digital audio/video 38 or 42. The auxiliary data is parsed by parser 50, and forwarded to processor 75 for interpretation and subsequent control of the PVR. Alternatively, data provided from an EPG or other source can be recovered and processed by the processor 75 to control the PVR. In this manner, only desired content is recorded and a television viewer does not have to waste time or PVR resources (e.g., hard drive space) on content that is not of interest.

Although the invention has been described in connection with various illustrated embodiments, numerous modifications and adaptations may be made thereto without departing from the spirit and scope of the invention as set forth in the claims.

What is claimed is:

1. A method for enabling advanced recording options on a personal versatile recorder (PVR), comprising:

receiving at the PVR a plurality of television signals;

providing for the recording of one or more television programs at the PVR;

automatically suspending recording, based on predetermined criteria detected by said PVR, for at least a portion of time during which said one or more television programs would otherwise be recorded; and providing an end of program notifier in said television signal which identifies the end of the program;

wherein:

each television program has a program end time;

the PVR waits a predetermined amount of time after said program end time to receive the end of program notifier; and recording of the program is terminated at the first to occur of (i) lapsing of the predetermined amount of time, and (ii) receipt of the end of program notifier.

2. A method in accordance with claim 1, wherein;

recording is suspended during the time when non-program specific content is received at the PVR; and the predetermined criteria comprises EPG data.

3. A method in accordance with claim 1, wherein said predetermined criteria comprises at least one of EPG data or Advanced Television Enhancement Forum (ATVEF) triggers.

4. A method in accordance with claim 1, wherein:

said end of program notifier is provided in one of ATVEF trigger information, a vertical blanking interval of an analog television signal, or a program identifier of a digital television signal.

5. A method in accordance with claim 1, wherein:
recording is suspended when a rerun of a program is detected; and
the predetermined criteria comprises EPG data.

6. A method for enabling advanced recording options on a personal versatile recorder (PVR), comprising:
receiving at the PVR a plurality of television signals;
providing for the recording of one or more television programs at the PVR;
automatically suspending recording, based on predetermined criteria detected by said PVR, for at least a portion of time during which said one or more television programs would otherwise be recorded;
providing additional information to the PVR indicating that a program being recorded supports end of program notifiers, thereby configuring said PVR to terminate the recording based on a notifier;
providing an end of program notifier in said television signal which identifies the end of the program; and
continuing recording of the program until receipt of the notifier;

7. A method in accordance with claim 6, wherein:
said additional information is provided in one of EPG data, ATVEF trigger information, a vertical blanking interval of an analog television signal, or a program identifier of a digital television signal.

8. A personal versatile recorder (PVR) having advanced recording options, comprising:
a receiver for receiving a plurality of television signals;
a storage device for recording of one or more television programs at the PVR; and
a processor for automatically suspending recording, based on predetermined criteria detected by said processor, for at least a portion of time during which said one or more television programs would otherwise be recorded;
wherein:
an end of program notifier is provided in said television signal which identifies the end of the program;
each television program has a program end time;
the PVR waits a predetermined amount of time after said program end time to receive the end of program notifier; and
recording of the program is terminated at the first to occur of (i) lapsing of the predetermined amount of time, and (ii) receipt of the end of program notifier.

9. Apparatus in accordance with claim 8, wherein;
recording is suspended during the time when non-program specific content is received at the PVR; and
the predetermined criteria comprises EPG data.

10. Apparatus in accordance with claim 8, wherein said predetermined criteria comprises at least one of EPG data or Advanced Television Enhancement Forum (ATVEF) triggers.

11. Apparatus in accordance with claim 8, wherein:
end of program notifiers are provided in one of ATVEF trigger information, a vertical blanking interval of an analog television signal, or a program identifier of digital television signal.

12. Apparatus in accordance with claim 8, wherein:
recording is suspended when a rerun of a program is detected; and
the predetermined criteria comprises EPG data.

13. A personal versatile recorder (PVR) having advanced recording options, comprising:
a receiver for receiving a plurality of television signals;
a storage device for recording of one or more television programs at the PVR; and
a processor for automatically suspending recording, based on predetermined criteria detected by said processor, for at least a portion of time during which said one or more television programs would otherwise be recorded;
wherein:
an end of program notifier is provided in said television signal which identifies the end of the program;
recording of the program is continued until receipt of the notifier; and
additional information is provided to the PVR indicating that the program supports end of program notifiers, thereby configuring said PVR to terminate the recording based on a notifier.

14. Apparatus in accordance with claim 13, wherein:
said additional information is provided in one of EPG data, ATVEF trigger information, a vertical blanking interval of an analog television signal, or a program indentifier of a digital television signal.

* * * * *